United States Patent [19]

Shuey et al.

[11] Patent Number: 5,874,903
[45] Date of Patent: Feb. 23, 1999

[54] RF REPEATER FOR AUTOMATIC METER READING SYSTEM

[75] Inventors: Kenneth C. Shuey; Kathryn J. Smith; Rodney C. Hemminger; Arnold W. Bragg, all of Raleigh, N.C.

[73] Assignee: ABB Power T & D Company Inc., Raleigh, N.C.

[21] Appl. No.: 870,640

[22] Filed: Jun. 6, 1997

[51] Int. Cl.[6] .................................................. G08B 23/00
[52] U.S. Cl. .............................. 340/870.02; 340/870.03; 340/870.18; 340/825.58; 340/825.69; 455/66; 375/211; 375/269
[58] Field of Search ........................ 340/870.18, 870.02, 340/870.03, 825.58, 825.69, 825.71, 825.72; 455/66, 88; 375/211, 216, 273, 269

[56] References Cited

U.S. PATENT DOCUMENTS

| | | | |
|---|---|---|---|
| 3,973,240 | 8/1976 | Fong | 340/151 |
| 4,031,513 | 6/1977 | Simciak | 340/870.18 |
| 4,056,107 | 11/1977 | Todd et al. | 130/27 R |
| 4,190,800 | 2/1980 | Kelly, Jr. et al. | 325/37 |
| 4,250,489 | 2/1981 | Dudash et al. | 340/147 T |
| 4,321,582 | 3/1982 | Banghart | 340/310 R |
| 4,608,699 | 8/1986 | Batlivala et al. | 375/81 |
| 4,617,566 | 10/1986 | Diamond | 340/870.11 |
| 4,638,298 | 1/1987 | Spiro | 340/827 |
| 4,692,761 | 9/1987 | Robinton | 340/825.01 |
| 4,724,435 | 2/1988 | Moses et al. | 340/870.13 |
| 4,783,748 | 11/1988 | Swartztrauber et al. | 340/825.08 |
| 4,884,021 | 11/1989 | Hammond et al. | 324/142 |
| 5,032,833 | 7/1991 | Laporte | 340/825.02 |
| 5,053,766 | 10/1991 | Ruiz-del-Portal et al. | 340/870.02 |
| 5,056,107 | 10/1991 | Johnson et al. | 375/1 |
| 5,179,376 | 1/1993 | Pomatto | 340/870.02 |
| 5,345,225 | 9/1994 | Davis | 340/635 |
| 5,406,495 | 4/1995 | Hill | 364/483 |
| 5,438,329 | 8/1995 | Gastouniotis et al. | 340/870.02 |
| 5,473,322 | 12/1995 | Carney | 340/870.02 |
| 5,495,239 | 2/1996 | Ouellette | 340/870.02 |
| 5,544,036 | 8/1996 | Brown, Jr. et al. | 364/145 |
| 5,572,438 | 11/1996 | Ehlers et al. | 364/492 |
| 5,621,629 | 4/1997 | Hemminger et al. | 363/56 |
| 5,684,472 | 11/1997 | Bane | 340/870.03 |

FOREIGN PATENT DOCUMENTS

| | | |
|---|---|---|
| 0395495 A1 | 10/1990 | European Pat. Off. . |
| 069098 A2 | 12/1994 | European Pat. Off. . |
| 59-229949 | 12/1984 | Japan . |
| 5-260569 | 10/1993 | Japan . |
| 02222898 | 3/1990 | United Kingdom . |

*Primary Examiner*—Michael Horabik
*Assistant Examiner*—Timothy Edwards, Jr.
*Attorney, Agent, or Firm*—Woodcock Washburn Kurtz Mackiewicz & Norris, LLP

[57] ABSTRACT

An automatic meter reading system utilizes repeater technology to access hard to read meters within a fixed network structure. The components of the radio system that are needed for two-way communications are employed without adding significant cost to the meter. Using this approach, each meter in the network has the ability to repeat messages as required.

14 Claims, 5 Drawing Sheets

RF REPEATER FOR AUTOMATIC METER READING SYSTEM

CROSS REFERENCE TO RELATED APPLICATIONS

The subject matter disclosed herein is related to the subject matter of application Ser. No. 08/870,751, filed on Jun. 6, 1997, entitled "Energy Meter with Multiple Protocols for Communication with Local and Wide Area Networks", now abandoned in favor of application Ser. No. 08/908,728, filed Aug. 7, 1997, the disclosure of which is incorporated by reference herein.

FIELD OF THE INVENTION

The present invention relates generally to a utility meter, and more particularly to a utility meter that is capable of serving as a wireless repeater in an automatic meter reading (AMR) network.

BACKGROUND OF THE INVENTION

The reading of electrical energy has historically been accomplished with human meter readers that came on-site to the customers' premises and manually documented the readings. The information extracted from the meters was simple pulse initiator information of basic quantities. (A pulse initiator (PI) is an optical device that picks up the rotations of a disc on an electromechanical meter. The disc rotations, which are proportional to energy use, are converted by the PI into pulses that can be read by computing devices.) Over time, manual meter reading has been enhanced with walk-by or drive-by reading systems that utilize radio communications between the meters and a meter reading device. The information that these walkby and driveby systems collected increased, but still the functions provided by the communication systems were limited. More recently, over the last few years, there has been a concerted effort to accomplish meter reading by installing fixed networks that would allow data to flow from the meter to a host computer system without human intervention.

In general, fixed communication networks can operate using wire line or radio technology. Distribution line carrier systems are wire based and utilize the utility's lines for communications. These systems typically use a single frequency channel and allow the impedance and transfer characteristics of the transformers in the substation to prevent injection equipment in one station from interfering with receivers in another station. This built-in isolation in the network makes time division multiplexing less critical than for radio based metering systems. Further background information regarding AMR (also called network meter reading, or NMR) can be found in U.S. Pat. No. 4,056,107, Feb. 15, 1990, "Radio Communication Network For Remote Data Generating Stations." Further information regarding the use of a meter having repeating capability in a CEBus network may be found in U.S. patent application Ser. No. 08/828, 539, filed Mar. 31, 1997, "Communications Module Based Repeater".

Radio frequency (RF) technology has recently tended to be the solution of choice due to its higher data rates and independence of the distribution network. RF frequencies approaching a gigahertz can be unlicensed or licensed, but unlicensed systems are significantly restricted in power output. This power restriction coupled with typical RF problems of attenuation, fading, noise and reflections makes some sites in a fixed network very inaccessible to a central node, and thus it can be difficult to achieve two-way performance adequate for the desired functions. These problems are sometimes resolved by manually reading the hard to access sites or by adding a vehicle system to the fixed network system (see, e.g., U.S. Pat. No. 5,495,239, Feb. 27, 1996, "Method and Apparatus for Communicating with a Plurality of Electrical Metering Devices and a System Control Center with a Mobile Node").

SUMMARY OF THE INVENTION

The present invention provides a utility meter for use in an AMR network. The meter includes a radio frequency (RF) transceiver, metering means, and a controller. The meter is programmed to receive a message from an AMR node via the RF transceiver and, depending on the content of the message, to respond to the node or repeat the message by sending a modified message in a format that is receivable by another meter in the AMR network.

In one presently preferred embodiment of the invention, the meter is operable to receive messages transmitted with a first prescribed signal type, to transmit responsive messages with a second prescribed signal type, and to repeat messages with the first prescribed signal type. In this embodiment, the first prescribed signal type is ASK and the second prescribed signal type is FSK. This selection of signal types is advantageous because ASK requires a less sophisticated receiver, which allows the meter to be less expensive. (ASK is a less robust communication technique, and as a result the data rate for ASK is 1 Kb/s. FSK is more robust and supports a data rate of 100 Kb/s.)

The present invention also provides a method for operating a utility meter used in connection with a fixed automatic meter reading (AMR) network. The inventive method comprises the steps of: receiving a message originated by an AMR node; determining whether the message is to be repeated; if the message is not to be repeated, determining whether the meter must respond to the message and, if so, transmitting a responsive message containing meter data; and if the message must be repeated, creating a modified message and transmitting the modified message. In accordance with the invention, the modified message is formatted to be receivable by another meter in the AMR network.

In a presently preferred embodiment of the method, the other meter is adapted to receive amplitude shift keyed signals and the modified message is formatted by amplitude shift keying (ASK). Further, the method includes the steps of, after creating and transmitting the modified message, waiting for a response from the other meter and, once this response is received, modifying the other meter's response and then transmitting the modified response. The modified other meter response is formatted so as to be receivable by the AMR node, which is adapted to receive frequency shift keyed signals and so the modified response of the other meter is formatted by frequency shift keying (FSK).

DETAILED DESCRIPTION OF PREFERRED EMBODIMENTS

Figure 5:
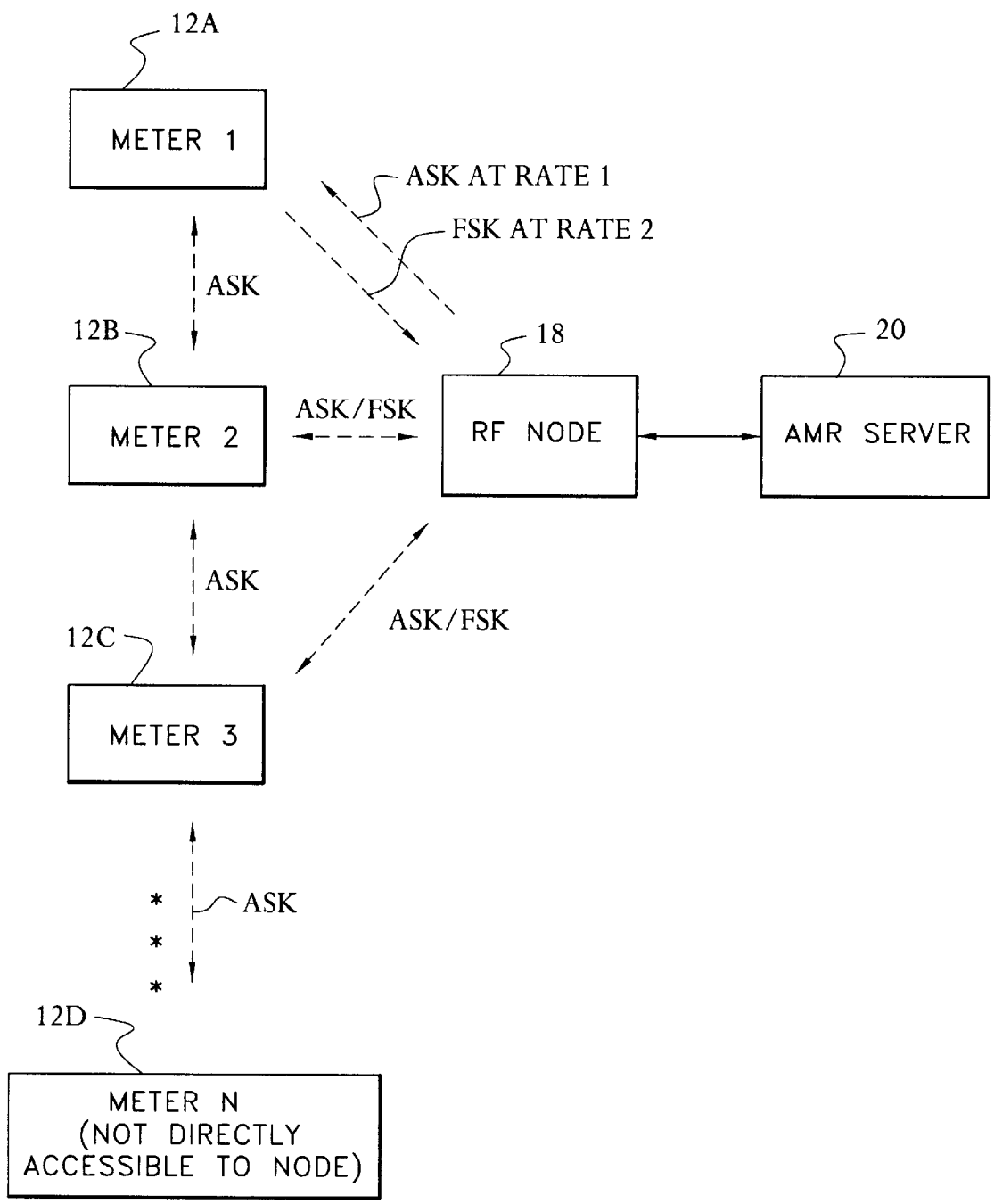
FIG. 5 is a block diagram of an AMR system employing repeaters in accordance with the present invention.
Figure 6:
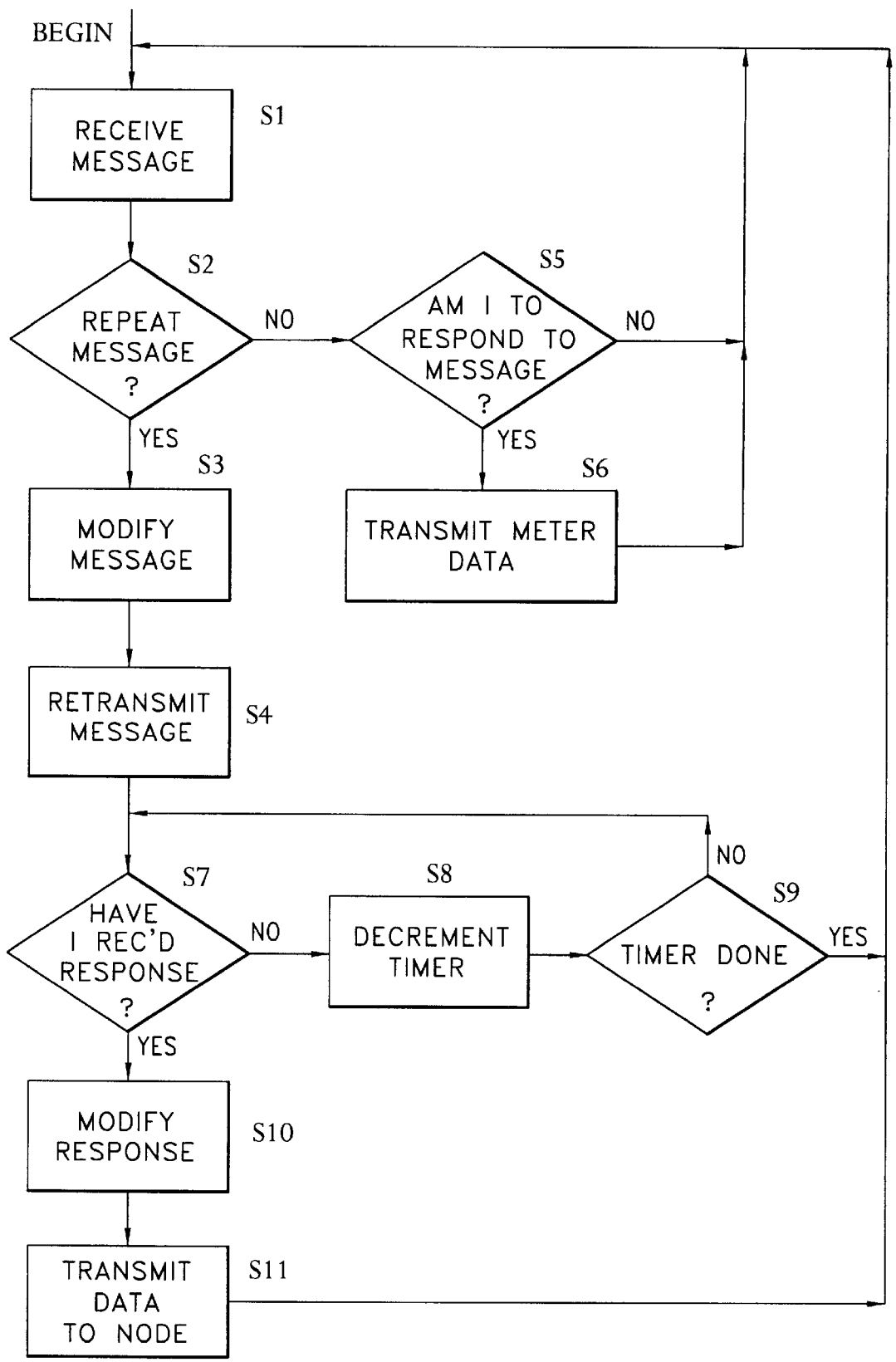
FIG. 6 is a flowchart of a method for operating a repeater in an AMR system in accordance with the present invention.

FIGS. 1–4 are substantially the same as FIGS. 1–4 of co-pending application Ser. No. 08/870,751, now abandoned in favor of application Ser. No. 08/908,728. FIGS. 5 and 6 focus on the aspects of the inventive system and method that are unique to the present specification. In order to place the description of the present invention in context, the disclosure concerning the aspects of the system depicted in FIGS. 1–4 will be summarized next, and then the aspects of the invention depicted specifically in FIGS. 5 and 6 will be described.

System Overview (FIGS. 1–4)

Figure 1:
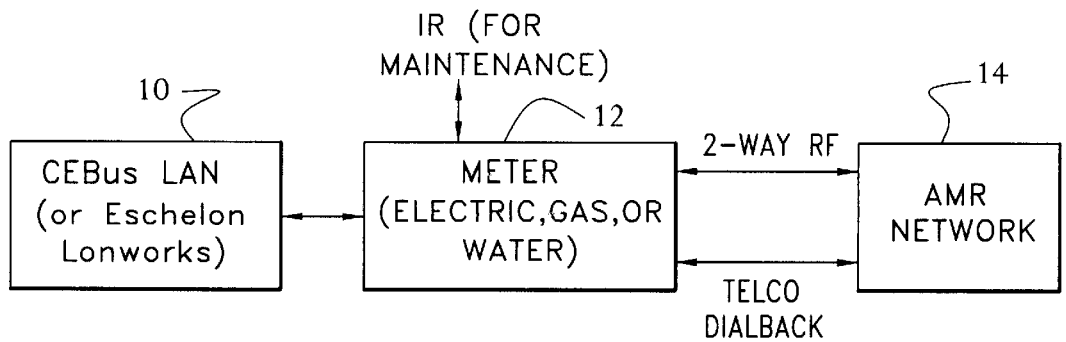
FIG. 1 is a simplified block diagram of an AMR system of the type disclosed in the above-cited co-pending application Ser. No. 08/870,751, now abandoned in favor of application Ser. No. 08/908,728.

To make an AMR system adaptive to higher functions, a variety of communication protocols may be incorporated into a solid state meter. As shown in FIG. 1, the AMR system includes a CEBus LAN 10, an electronic meter 12 (actually a plurality of such meters and LANs), and a fixed AMR network 14. The meter 12 utilizes a two-way RF protocol, for communicating with the AMR network 14, that allows very cost effective meter reading to take place. The meter also incorporates a protocol for dialback telephone for locations within a large metering system where RF communication is not the optimal selection.

In addition to these AMR protocols, the meter 12 includes support for CEBus communications. This protocol allows the meter to be manufactured without an internal display and still communicate with a display within the house if that is a requirement. In addition, the CEBus protocol allows access to home automation in situations where that is warranted. If home automation is not needed but security is, the meter 12 can use the CEBus protocol for access into the security system. In all cases, the two-way RF system can be utilized for read/write data required for the system (with all messages ported through the meter).

The basic requirement for all the various systems mentioned above is a robust two-way RF protocol that links the meter with a host computer of the AMR network 14. This protocol must have the capability to pass messages through the meter 12 into the CEBus network 10. This pass through signaling permits rate management for electricity (in an electric meter application), message displays for customer alerts, demand side management deployment and other activities. The protocol preferably also has the capacity to allow the meter to report by exception for events such as security related activities and outage reporting. This capability within the RF protocol for advanced functions is included without burdening the basic capability of the meter to accomplish simple AMR in a very cost effective manner.

The CEBus protocol provides a link to a remote residential display for simple AMR as well as higher functions. In addition to the display capability, CEBus provides a peer-to-peer communication capability which allows the meter to pass through information to any other device that is on the CEBus LAN 10. This effectively allows the meter to be the gateway into the residential system for all levels of communication requirements.

Figure 2:
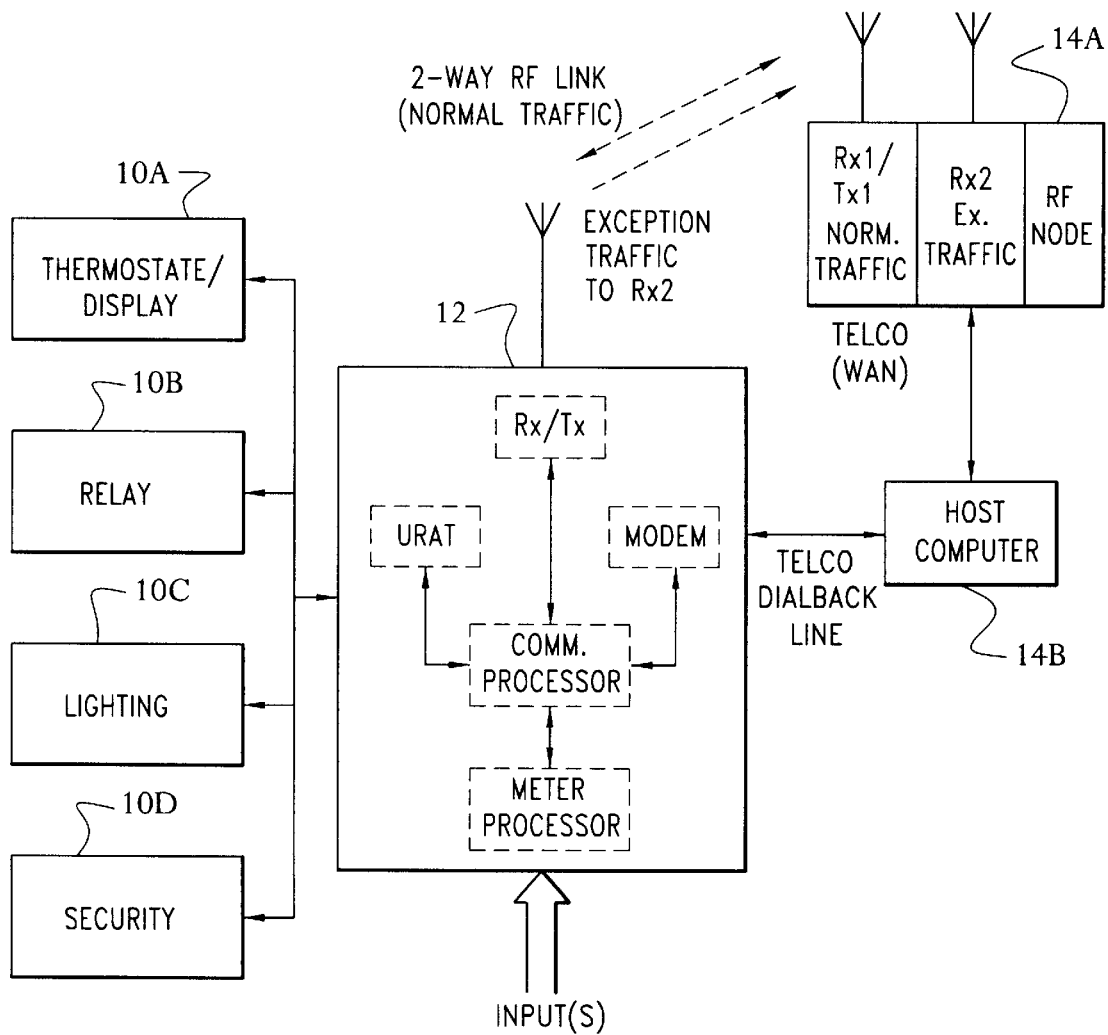
FIG. 2 is a more detailed block diagram of the AMR system of FIG. 1.

FIG. 2 provides a more detailed illustration of the system. As shown, the CEBus LAN 10 includes a thermostat/display device 10A that can be used by the meter 12 to display information to the customer (via CEBus communications). In addition, the LAN 10 may include relay 10B, lighting 10C and security 10D subsystems that may be controlled through the CEBus protocol.

The meter includes an RF transceiver for communicating normal and exception AMR traffic to the AMR network 14. The meter also includes a modem for so called dialback telephone communications with the AMR network, a UART transceiver, or the like, for communicating with the CEBus LAN 10, and a meter processor for controlling the metering functions as required for a given application. (Such meter functions are described, e.g., in U.S. Pat. No. 5,621,629, Apr. 15, 1997, titled "Switching Power Supply For Use In An Electronic Meter Having Wide Range Of Input Voltages.") An infrared (IR) transceiver may be used to read the meter externally with an optical probe (for special test cases).

The AMR network 14, in the embodiment of FIG. 2, includes an RF node 14A (actually a plurality of such nodes) and a host computer, or server, 14B (or multiple hosts, as needed). The node 14A includes a transceiver for normal traffic and a receiver for exception traffic, as discussed above. The plurality of RF nodes and host computer(s) constitute a wide area network (WAN).

Figure 3:
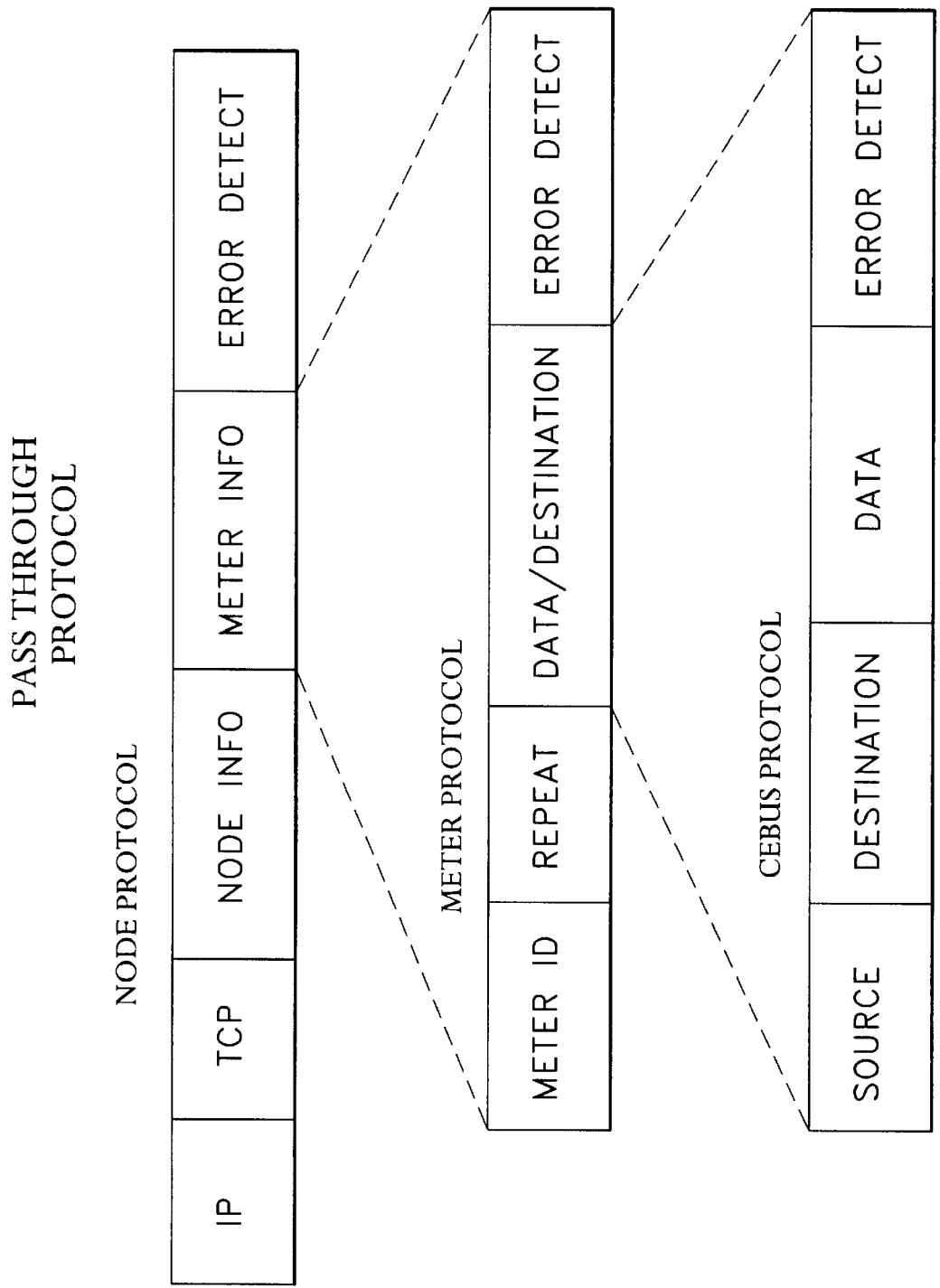
FIG. 3 schematically illustrates a pass through protocol.

Referring now to FIG. 3, a pass through protocol useful in this system includes a CEBus protocol embedded in a meter protocol, which in turn is embedded in a node protocol. Meter information in a node protocol packet includes meter ID, a repeat count, data and destination address, and error detection bits. The data/destination bits of the meter protocol are passed through to the CEBus network and include source and destination addresses, data, and error detection bits. In presently preferred embodiments of the invention, the pass through protocols for the system are tabled based. The tables are designed to allow data, functions, commands, schedules, etc., to be passed to the different system elements. For example, a host can send table information to a node that will cause a group of meters to be read. The node can send table information to the meter that will cause a CEBus communication to take place. In addition, the normal meter reading information is passed in table format from the meter to the node. The type and location of data in the meter tables will cause CEBus communications to take place on schedule, randomly, or upon exception. In this manner, the meter passes information from one communication protocol to the other.

Figure 4:
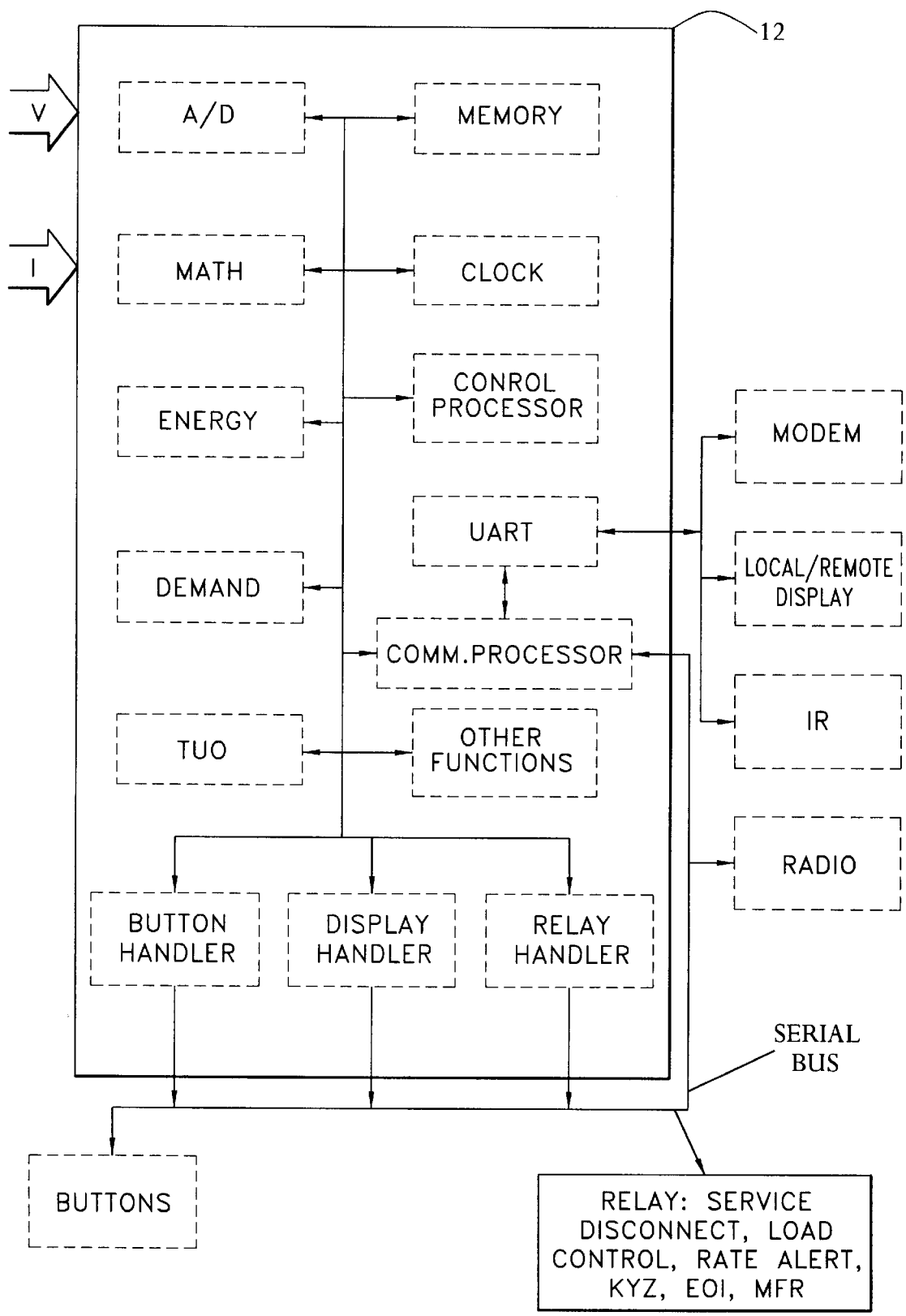
FIG. 4 is a block diagram of a solid state electric meter.

FIG. 4 is a more detailed block diagram of a solid state electronic meter 12. As shown, the meter 12 includes a control processor; communications processor; clock; memory; analog-to-digital (A/D) convertor (for digitizing input voltage and current measurements); math coprocessor; energy, demand and time of use processors; and button, display and relay handlers. The various processor functions may be implemented with one or more microprocessors or digital signal processors controlled by various firmware or software modules, and the button, display and relay handlers may be implemented with combinations of hard wired circuitry and/or software or firmware. One or more serial buses are employed for communications between the meter 12 and radio (RF transceiver), modem, transceiver, relays, display and control buttons (where the relay, display and buttons may be part of the CEBus LAN 10 (FIG. 2).

In one exemplary embodiment including gas and water meters, the node to electric meter repeater transmits at a rate of 1 Kb/s, the meter repeater to gas/water meter transmissions are at 128 b/s, the gas meter response is at 1 Kb/s and the meter repeater to node transmission is at 100 Kb/s. There are bits in the protocol to tell the meter repeater the data rate at which to transmit.

The Present Invention (FIGS. 5–6)

To make the RF system adaptive to read the hard to access meters within the network, it would be advantageous to have a method by which the node transceiver could be effectively moved closer to the hard to access meter. The present invention provides just such a method by allowing any meter in the network to be a repeater. This concept is depicted in FIG. 5, which schematically depicts a plurality of meters 12A, 12B, 12C, . . . , 12D, where meter 12D is considered "inaccessible" (i.e., difficult to reach by direct RF communications) with respect to a responsible node 18. Node 18 is called the "responsible" node in this example because it has primary responsibility for communicating with meters 12A–12D, although it is possible for more than one node to have the ability to communicate with a given node. (Such redundancy may be desired in situations where the added system reliability is worth whatever added cost is required.) The node 18 is coupled to an AMR server 20, e.g., by a telephone link or some other wired or wireless communications link. With the present invention, information from the AMR node 18 that does not reach the "inaccessible" meter 12D can be routed through a meter (e.g., meter 12C) that the node does reach and has the capability to reach the hard to access meter. This repeat function is installed with a minimum of additional cost to each meter.

In the presently preferred embodiment of the invention, receive and transmit signal speeds and characteristics for the meter transponder are different. The receive signal from the node 18 is modulated by ASK (amplitude shift keying) at a first rate (rate 1). The transmit signal from the meter is modulated by FSK (frequency shift keying) at a data rate (rate 2) higher than the receive rate (rate 1). To permit the meter to function as a repeater and to allow a downstream meter to be heard by the repeater, the meter transmitters are able to duplicate the signals normally received from the node 18. A very simple modification to the transmitter (e.g., a direct sequence spread spectrum (DSSS) transmitter) in the meter transponders allows them to work as ASK transmitters. As a result of this simple modification, coupled with a repeater field embedded in the protocol, a repeater/meter can receive an outbound request from the node 18 and duplicate it (altering the repeater field to let the remote meter know the message is to be answered and to be answered with an ASK response rather than an FSK response). When the meter responds to the request, the repeater/meter will hear the response (this time the repeater field confirms it is a return message). When the repeater/meter has completed the reception, the contents will be sent back to the node 18 as a normal FSK meter response. For example, in a preferred embodiment of the invention, the meter receives information from the node at 1 Kb/s, and repeats to meter 12D at 1 Kb/s. Meter 12D will respond at 1 Kb/s, and the meter repeater will send data back to the node at 100 Kb/s.

In this manner, the fixed RF system can be made to adapt when propagation paths are inadequate from node to meter or meter to node. All repeater communications to meters are handled on a unique address basis and timing is controlled by the host computer (e.g., host 14B, FIG. 2).

Referring now to FIG. 6, the method of operation of a given meter will now be summarized. The inventive method begins with the reception of a message (step S1). Next, the meter determines whether this is a message to be repeated (step S2). This is accomplished by examining the "repeat" field of the meter protocol (FIG. 3). If the message is to be repeated, i.e., is intended for a downstream meter (such as meter 12D of FIG. 5), the meter modifies the message (step S3) and then retransmits it as an ASK signal that may be received by the other meters (step S4). The message is modified in step S3. (For example, the message may be modified by changing a two-bit field to indicate the end meter is to respond (e.g., the field may be changed from "10" to "00"). When the end meter responds with a "00" value, the meter repeater changes it to "01", to indicate that the message is inbound to the node, and transmits an FSK response.) If, on the other hand, the message is not to be repeated (as determined at step S2), meaning that this meter is the intended recipient, the meter determines whether it must respond (step S5) and, if so, transmits an appropriate response (step S6) in the FSK format for reception by the node 18.

At steps S7, S8 and S9, which are reached only if the message is a "repeat" message as determined at step S2, the meter waits for a response from a downstream meter (e.g., the "inaccessible" meter 12D of FIG. 5). Once such a response is received, the meter modifies the responsive message (step S10) and then transmits it (step S11) to the node or to another meter.

INCREASING RANGE OF NODE

The following discussion provides an enhancement to the system protocol. The driver for this protocol change is the high cost of the node implementation and the burden that cost places on the meter. Combining recent field tests with the potential improvements in the RF design, it appears that the high performance (>95%) distance that can be expected for an optimized ISM band system will be 750–1000 feet in a typical urban environment. This area of coverage will allow less than 100 electric meters to be read using residential lot sizes of 150'×150'. With the knowledge of the projected node cost, this coverage will result in excess of $20 burden to the meter. To achieve a reasonable burden cost, the system goal is 400 meters read from every node. To achieve this 400 meter goal, the system can be changed some ways. It does not appear that the system can be made to achieve the goal strictly through RF design improvements. The FCC limits on transmit power, coupled with the various environmental conditions, put upper limits on the coverage. As a result, other approaches are examined to increase the range. The following protocol change is one such approach.

REPEATER PROTOCOL CHANGE

Direct

| 00 | 000000 | NODE-->METER OR METER-->NODE | (SPARE = OOOOOOOO) |

In the direct communication, the RPT field=000000 tells the meter this is not a repeated message.

Single Level Repeat

| 01 | YYYYYY | NODE-->RPT | (SPARE = OOOOOOOO) |
| 00 | YYYYYY | RPT-->METER OR RPT-->NODE | (SPARE = OOOOOOOO) |
| 10 | YYYYYY | METER-->RPT | (SPARE = OOOOOOOO) |

In the single level repeat, the 01 says outbound and the YYYYYY from the node must match the RPTy address. The SPARE=OOOOOOOO indicates single repeat (as compared to double repeat). RPTy changes the 01 to 00 and transmits the message keeping RPT=YYYYYY and SPARE= 00000000. The meter changes 00 to 10 indicating inbound, keeps the RPT field=YYYYYY and transmits the message. RPTy sees the address match, changes 10 to 00, keeping the RPT field=YYYYYY, and transmits the message on to the node. The node knows which meter the data is from by the unique address and which RPT from the RPT field.

Double Repeat

| | | |
|---|---|---|
| RPT = 01XXXXXX | NODE-->RPTx | SPARE = 01YYYYYY |
| RPT = 11YYYYYY | RPTx-->RPTy | SPARE = 01XXXXXX |
| RPT = 00YYYYYY | RPTy-->METER | SPARE = 01XXXXXX |
| RPT = 10YYYYYY | METER-->RPTy | SPARE = 10XXXXXX |
| RPT = 11XXXXXX | RPTy-->RPTx | SPARE = 10YYYYYY |
| RPT = 00YYYYYY | RPTx-->NODE | SPARE = 10XXXXXX |

In the two level repeat, the node sets an 01 for outbound with the RPT field XXXXXX, the address of the 1st RPT in the chain. The SPARE bits are set to the 2nd RPT address of YYYYYY with a 01 code as an indication that the communication is outbound. RPTx sees an address match in the RPT field and recognizes there is a non-zero address in the SPARE field with an 01 code. These are the keys to know this is a RPT to RPT outbound message. RPTX changes the RPT field to YYYYYY using the SPARE data and sets the RPT field code to 11 for RPT to RPT. In this case, RPTx sets the SPARE bits to XXXXXX for use later in the communication sequence and keeps the code=01 for outbound. RPTy recognizes the address match in the RPT field and knows the message is RPT to RPT from the 11 code. RPTy then changes the 11 code to 00 to indicate the message is for a meter, keeps the rest of the RPT and SPARE data unchanged and transmits the message. The meter recognizes its unique address (not shown here) and sees from the RPT and SPARE fields that this is a double repeat message (the 00 code will tell the meter to respond to this command).

The meter changes the RPT and SPARE codes to 10 to indicate that this is now inbound and keeps the RPT and SPARE addresses unchanged. The meter transmits the required response with this RPT data enclosed. RPTy receives the inbound message with the RPT address match and recognizes the SPARE bits=XXXXXX and the SPARE code indicates inbound. These are the keys for a RPT to RPT communication, so RPTy sets the RPT code to 11 and places next RPT address in the RPT field (taken from the SPARE field). RPTy keeps the SPARE code for inbound, places its address in the SPARE field and then transmits the message. RPTX receives the RPT to RPT message with the address match, leaves the RPT field and SPARE field unchanged, modifies the RPT code to 00 (indicating an RPT to node communication) and transmits the message. The node will extract the meter unique address as well as both RPT addresses from the data packet. In this manner, performance statistics can be kept for all RPTs in the system.

Due to the overlap that will exist between node coverage areas, a match of the Source Node address is part of the criteria for a message to be repeated. Otherwise there will be a lot of extraneous traffic that will create communication errors.

In sum, the presently preferred embodiments of the invention provide the following features:
1. A fixed network RF communications system that utilizes a repeater for communications with devices that are hard to access directly from nodes.
2. A fixed network RF communications system that has the option to utilize any meter as a repeater.
3. A two-way RF system architecture that utilizes a protocol allowing any meter to act as a repeater if so programmed.
4. An adaptive two-way RF communications system that resolves hard to access locations through programming individual meters to act as repeaters.
5. A method for allowing a meter to act as a repeater with very little cost impact.
6. A system that allows repeaters to be used for normal communications and exception reports that are initiated at the meter. (For the exception reports, all active repeaters will respond and retransmit the message via a time slot mechanism similar to that used for group responses.)

While the present invention has been described and illustrated with reference to specific, presently preferred embodiments, those skilled in the art will recognize that modifications and variations may be made without departing from the principles of the invention as described above and set forth in the following claims. For example, except as they may be explicitly so limited, the claims are not restricted to embodiments of the invention in which the metering device measures electrical energy or power, since the invention is also applicable to water and gas meters. The claims may also cover a meter which is not specifically utilized in connection with a CEBus LAN, or a system in which many but not all meters have repeater capabilities. Other features of the presently preferred embodiments described above may be modified without substantially departing from the teachings set forth herein.

We claim:

1. A utility meter for use in an automatic meter reading (AMR) network, comprising:

(a) a radio frequency (RF) transceiver;

(b) metering means; and (c) a controller operatively coupled to said RF transceiver and said metering means, said meter being programmed to receive a message from an AMR node via said RF transceiver and, depending on the content of said message, to respond to said node or repeat said message by sending a modified message in a format that is receivable by another meter in said AMR network;

wherein said meter is operable to receive messages transmitted with a first prescribed signal type and a first data rate, to transmit responsive messages with a second prescribed signal type and a second data rate, and to repeat messages with said first prescribed signal type, and wherein said second data rate is substantially higher than said first data rate.

2. A utility meter as recited in claim 1, wherein said first prescribed signal type is ASK.

3. A utility meter as recited in claim 1, wherein said second prescribed signal type is FSK.

4. A utility meter as recited in claim 1, wherein said first prescribed signal type is ASK and said second prescribed signal type is FSK; and said first data rate is one of about 1 Kb/s and about 128 b/s and said second data rate is about 100 Kb/s.

5. A utility meter for use in an automatic meter reading (AMR) network, comprising:

(a) a radio frequency (RF) transceiver; and (b) a controller operatively coupled to said RF transceiver, said meter being programmed to receive a message from an AMR node via said RF transceiver and, depending on the content of said message, to respond to said node or repeat said message by sending a modified message in a format that is receivable by another meter in said AMR network;

wherein said meter is operable to receive messages transmitted with a first prescribed signal type and a first data rate, to transmit responsive messages with a second prescribed signal type and second data rate, and to repeat messages with said first prescribed signal type; and wherein said first prescribed signal type is ASK and said second prescribed signal type is FSK.

6. A method for operating a utility meter used in connection with a fixed automatic meter reading (AMR) network, comprising the steps of:

(a) receiving a message originated by an AMR node;

(b) determining whether the message is to be repeated;

(c) if the message is not to be repeated, determining whether the meter must respond to the message and, if so, transmitting a responsive message containing meter data, said responsive message being characterized by a first data rate; and (d) if the message must be repeated, creating a modified message and transmitting the modified message, wherein said modified message is formatted so as to be receivable by another meter in the AMR network, and wherein said modified message is characterized by a second data rate that is substantially less than said first data rate.

7. A method as recited in claim 6, wherein said responsive message contains meter data.

8. A method as recited in claim 6, wherein said other meter is adapted to receive amplitude shift keyed signals, and said modified message is formatted by amplitude shift keying (ASK).

9. A method as recited in claim 6, wherein said other meter is adapted to receive amplitude shift keyed signals and said modified message is formatted by amplitude shift keying (ASK); and wherein the method further comprises the steps of, after creating and transmitting the modified message, waiting for a response from the other meter and, once said response from the other meter is received, modifying the other meter's response and then transmitting the modified response of said other meter, wherein the modified other meter response is formatted so as to be receivable by said AMR node, said AMR node being adapted to receive frequency shift keyed signals and said modified response of said other meter being formatted by frequency shift keying (FSK).

10. A method as recited in claim 6, further comprising the steps of waiting for a response from the other meter and, once said response from the other meter is received, modifying the other meter's response message and transmitting the modified response of said other meter, wherein said modified other meter response is formatted so as to be receivable by said AMR node.

11. A method as recited in claim 10, wherein said AMR node is adapted to receive frequency shift keyed signals, and said modified response of said other meter is formatted by frequency shift keying (FSK).

12. A utility meter for use in an automatic meter reading (AMR) network, comprising:

(a) a radio frequency (RF) transceiver; and (b) a controller operatively coupled to said RF transceiver, said meter being programmed to receive a message characterized by a data rate is one of about 1 Kb/s and about 128 b/s from another meter via said RF transceiver, and to retransmit said message by sending a modified message in a format that is receivable by a node in said AMR network, said modified message being characterized by a data rate of about 100 Kb/s.

13. A utility meter as recited in claim 12, wherein said meter is operable to receive messages transmitted with a first prescribed signal type, to transmit responsive messages with a second prescribed signal type, and to repeat messages with said first prescribed signal type.

14. A utility meter as recited in claim 13, wherein said first prescribed signal type is ASK and said second prescribed signal type is FSK.

* * * * *